UNITED STATES PATENT OFFICE.

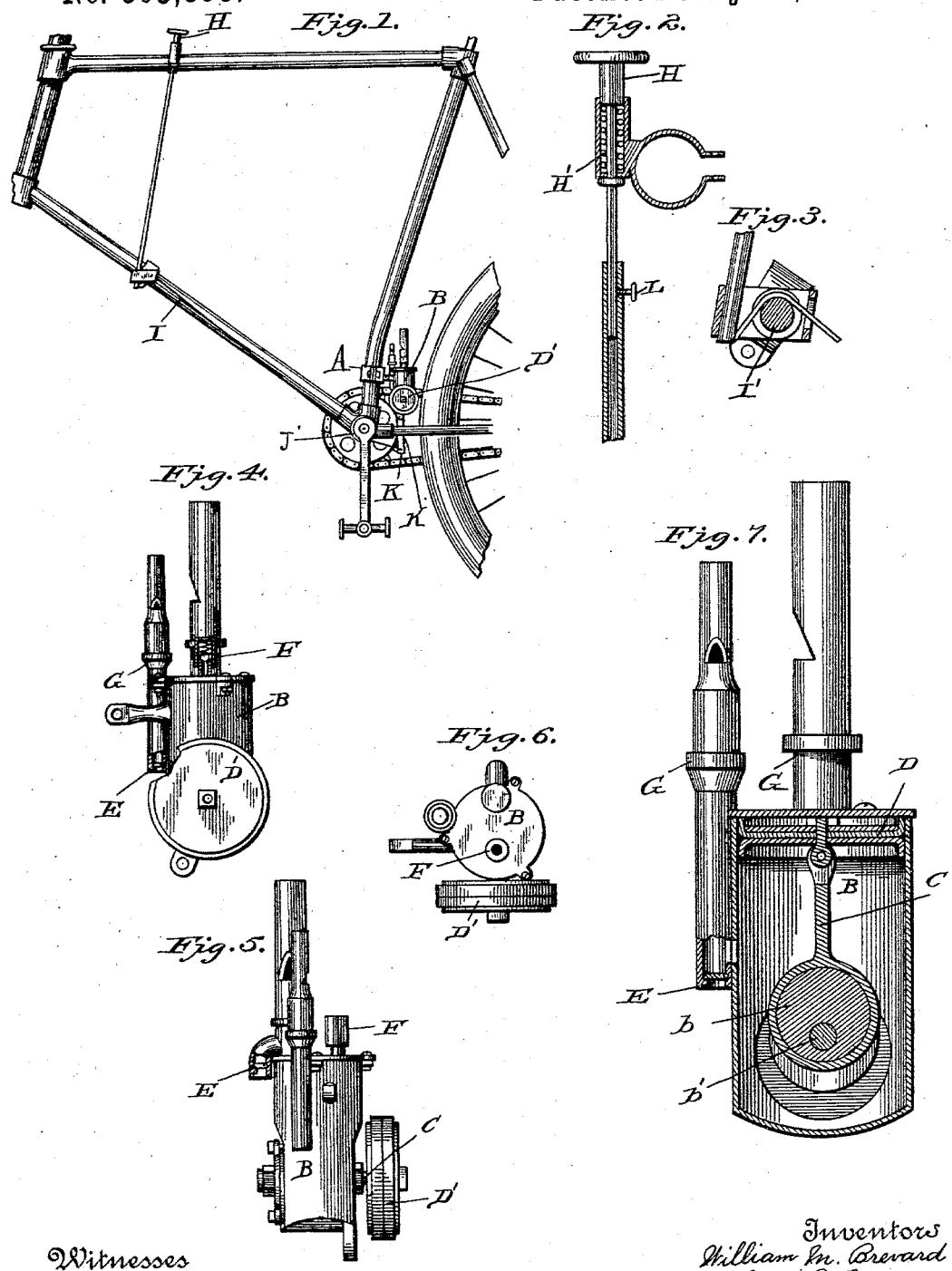

WILLIAM M. BREVARD, WILLIAM B. ORR, AND JOHN W. SOFGE, OF MACON, GEORGIA.

BICYCLE-ALARM.

SPECIFICATION forming part of Letters Patent No. 563,838, dated July 14, 1896.

Application filed January 27, 1896. Serial No. 577,005. (No model.)

*To all whom it may concern:*

Be it known that we, WILLIAM M. BREVARD, WILLIAM B. ORR, and JOHN W. SOFGE, citizens of the United States, residing at Macon, in the county of Bibb and State of Georgia, have invented certain new and useful Improvements in Whistles; and we do hereby declare the following to be a full, clear, and exact description of the invention, such as will enable others skilled in the art to which it appertains to make and use the same.

This invention relates to certain new and useful improvements in alarms or whistles designed for attachment to a bicycle or any other vehicle or carriage, designed to furnish air or pump air and sound a whistle or whistles or other alarm and to be used in giving a warning or as a danger-signal. The power is obtained by means of a friction-wheel or other mechanism set in motion by engagement or contact with the wheel of the bicycle or other vehicle, and a push-button or analogous device is arranged convenient to the seat or otherwise, to be actuated when it is desired to sound the alarm.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a side elevation showing our improvement applied to a bicycle. Fig. 2 is an enlarged detail of the push-button. Fig. 3 is a detail of the roller over which the cord passes. Fig. 4 is an enlarged view of the pump. Fig. 5 is a view at right angles to Fig. 4. Fig. 6 is a top plan. Fig. 7 is an enlarged detail, partly in elevation and partly in section, of the pump and wheels.

Like letters of reference indicate like parts in the various views.

Referring now to the details of the drawings by letter, A designates a frame or clasp or clamp adapted for attachment to the frame of a bicycle or other vehicle and supporting the barrel B, which is pivotally mounted upon said clasp, as seen in Fig. 1, by means of the arm seen extended from the left thereof in Fig. 4, and which barrel may be composed of several pieces suitably connected together if desired, and having an eccentric $b$ tight on the shaft $b'$ running in two bearings having the eccentric-straps C connected to the pump-plunger D with packing of any suitable character, preferably consisting of a piece of cut leather, said shaft being provided with a friction-wheel D', mounted to revolve in contact with the periphery or tire of the wheel, as shown in Fig. 1. This pump is provided with inlet valve or valves E and has a pressure-release valve F, the pump-barrel being provided with threaded nipple or nipples G for detachable connection of the whistles or reeds or any instrument for warning, so that any one may be removed and another put in its place when desired.

The pump may be made either single or double acting and can be used either way when double-acting. It can be made in size large or small, to suit the conditions under which it is to be used. All of the running parts are designed to run in oil or other lubricant in air-tight case and do not heat the air or any of the running parts.

When it is desired to sound the whistle or alarms, a push-button or analogous device H is provided, as seen in Fig. 1, which is mounted for vertical movement through a suitable support on the cross-bar of the frame, or in any other position, being firmly held outwardly by a spring H' acting against the under face of the head thereof, while its other end has connected therewith a cord I, which passes over a suitable roller I', held in the support or casing, the said cord or chain running over pulley or pulleys J' on the frame and connected with the lever K, pivotally mounted, as at $k$, the upper end of said lever being connected with the lug on the lower end of the cylinder or barrel, as seen in Fig. 2, and when this push-button or analogous device is depressed the lever K is moved on its pivot and the wheel D' thrown into engagement with the periphery of the tire of the bicycle-wheel, and as the said wheel D' is thus revolved the whistle will be sounded, and when pressure is removed therefrom the spring returns to its normal position and closes the valve.

Modifications in detail may be resorted to without departing from the spirit of the invention or sacrificing any of its advantages. We may sometimes change connections between the push-button and the cord or chain and make the said rod telescopic, as indicated, a set-screw L being provided to hold the parts in their adjusted position. The pulley or pulleys over which the cord passes may be grooved if desired. Other slight changes of a similar nature we should consider as fully within the scope of our invention.

Having thus described the invention, what is claimed as new is—

1. The combination with the pump-barrel having a shaft carrying a friction-wheel, an eccentric on said shaft within the barrel, eccentric-straps connected to the plunger, inlet-valves and a pressure-release valve and whistles, a push-button and a pivoted lever connected therewith and adapted to throw mechanism into operative position to sound a whistle, substantially as described.

2. The combination with the pump-barrel having a shaft carrying a friction-wheel, an eccentric on said shaft within the barrel, eccentric-straps connected to the plunger, inlet-valves and a pressure-release valve and whistles, a push-button and a pivoted lever connected therewith and adapted to throw the mechanism into operative position to sound a whistle, and a spring acting upon said push-rod to hold it in its outward position, substantially as described.

3. The combination with the pump-barrel having a shaft carrying a friction-wheel, an eccentric on said shaft within the barrel, eccentric-straps connected to the plunger, inlet-valves and a pressure-release valve and whistles, a push-button and a pivoted lever connected therewith and adapted to throw mechanism into operative position to sound a whistle, and a spring acting upon said push-rod to hold it in its outward position, a grooved wheel and a cord connected with the push-button and passed over said grooved wheel, substantially as described.

In testimony whereof we have signed this specification in the presence of two subscribing witnesses.

WILLIAM M. BREVARD.
WILLIAM B. ORR.
JOHN W. SOFGE.

Witnesses:
A. B. QUINLON,
CHRIS. C. BALKCOM.